United States Patent [19]
Harvey

[11] Patent Number: 5,471,436
[45] Date of Patent: Nov. 28, 1995

[54] VIBRATION ISOLATION MODULES (VIM) FOR TOWED ARRAY STREAMERS

[75] Inventor: Anthony P. Harvey, Burwood, Australia

[73] Assignee: GEC Marconi Systems PTY Limited ACN 003 890 515, Meadowbank, Australia

[21] Appl. No.: 290,985

[22] PCT Filed: Feb. 21, 1992

[86] PCT No.: PCT/AU92/00066

§ 371 Date: Aug. 19, 1994

§ 102(e) Date: Aug. 19, 1994

[87] PCT Pub. No.: WO93/17355

PCT Pub. Date: Sep. 2, 1993

[51] Int. Cl.$^6$ .............................. H04R 1/44; H01B 7/12
[52] U.S. Cl. ...................... 367/154; 367/20; 174/101.5
[58] Field of Search .................... 174/101.5; 367/20, 367/154, 155

[56] References Cited

U.S. PATENT DOCUMENTS

| | | |
|---|---|---|
| 3,710,006 | 1/1973 | Davis . |
| 3,766,307 | 10/1973 | Andrews . |
| 4,090,168 | 5/1978 | Miller et al. . |
| 4,241,427 | 12/1980 | Swenson ................................. 367/20 |
| 4,402,069 | 8/1983 | Miller et al. ........................... 367/154 |
| 4,510,588 | 4/1985 | Kruka et al. . |
| 4,525,813 | 6/1985 | Burrage ................................... 367/20 |
| 4,597,065 | 6/1986 | Lien et al. .............................. 367/20 |
| 4,628,851 | 12/1986 | Appling ............................. 174/101.5 |
| 4,641,288 | 2/1987 | McGowan et al. . |
| 4,660,183 | 4/1987 | McGowan et al. ...................... 367/20 |
| 4,809,243 | 2/1989 | Bledsoe et al. . |
| 4,920,523 | 4/1990 | Kruka et al. ........................... 367/154 |
| 5,089,668 | 2/1992 | Harvey .................................. 174/101.5 |
| 5,204,843 | 4/1993 | Beauducel ............................... 367/20 |

FOREIGN PATENT DOCUMENTS

| | | |
|---|---|---|
| 8764182 | 3/1983 | Australia . |
| 5925186 | 1/1987 | Australia . |
| 4532189 | 5/1990 | Australia . |
| 4531989 | 6/1990 | Australia . |
| 2003279 | 5/1990 | Canada ............................... 174/101.5 |
| 2115849 | 4/1990 | United Kingdom . |
| WO87/03379 | 6/1987 | WIPO . |

Primary Examiner—Charles T. Jordan
Assistant Examiner—Theresa M. Wesson
Attorney, Agent, or Firm—Marshall & Melhorn

[57] ABSTRACT

A towed streamer including buoyant core (1), and strength members (3) to transmit tension along the streamer. Strength members (3) are arranged so that the streamer is compliant for a predetermined elongation of the streamer. Members (3) are embedded in an inner jacket (5) surrounded by an outer jacket (6). The assembly is encased in an extruded outer jacket (2). Braided data bearers (4) can be provided between the inner jackets (5, 6). Strength members (3) can be braided with interstices impregnated with gel. Where the strength members (3) are of non-compliant material, the braid is initially compliant where the streamer is slightly elongated but becomes non-compliant as the streamer elongates further. Alternatively a combination of compliant (3) and non-compliant members (14) can be used where the compliant members (3) only become engaged after a predetermined elongation of the streamer.

14 Claims, 3 Drawing Sheets

VIBRATION ISOLATION MODULES (VIM) FOR TOWED ARRAY STREAMERS

BACKGROUND OF THE INVENTION

This invention relates to the construction of towed streamers suitable for use as vibration isolation modules (VIMs) and the method of manufacture of such towed sections.

Streamers are generally of one of two types. One such type are liquid filled and have been used as a prior art, and generally have strength members, the pay load and data transmission means within a liquid core with a jacket encapsulating these components. Such streamers are generally less robust than streamers of a generally solid nature.

Towed streamers usually comprise an elongate buoyant streamer having spaced along its length the required payload. Streamers are generally made from several shorter modules which are joined together to form the full length, and the modules used along the length have varying structures and are designed to perform different functions. The reason for positioning more than one type of module along the length of the streamer is in part because prevailing ambient conditions and forces associated with towing vary along the length.

Towed streamers are usually of considerable length and are subject to quite high towing strains and are consequently provided with rigid, high tensile or non-compliant strain members longitudinally to transmit tension along the streamer.

It is necessary for towed streamers to be constructed to withstand towing tensions whilst also allowing sufficient flexibility for winching onto a bollard or the like and problems are generally encountered in maintaining the spacing and/or position of strength members during such winching.

When using towed streamers consisting of a towing section, active section and tail sections, vibrational energy is generated from both the towing and the tail end. The forward end energy arises from ships' motor, machinery and propeller vibration, and flow induced vibration from normal and tangential flow over the towing section. The tail end energy arises from tangential and normal flow over the tail end sections, especially where the tail end is attached to a surface buoy. Where the tail has a free end, vortex shedding from the tail produces lateral motion which translates into axial vibration.

The vibration energy is picked up by the sensors in the active section of the streamer, from two mechanisms (a) physical movement of the sensor and (b) through pressure generated in the fluid which normally surrounds the sensor.

Towed streamers by their nature are deployed from and recovered into the towing vessel and the usual method is to stow the streamer on a winch. This provides a compact method of stowing the streamer. The recovery cycle can be achieved by directly winching the streamer onto the drum or by detensioning the streamer prior to stowage on the drum. If short recovery times are to be achieved, it is essential that all streamer sections are robust and are capable of being stowed on the winch under tension.

One aspect of this invention is that the towed streamers can be deployed and recovered during streamer operations at a load which permits the towing vessels to proceed slowly, rather than have to stop, during recovery. This is a major advantage if several streamers are towed from a single vessel. Recovery of the VIMs can be achieved by direct winching or by a combination of direct winching and some form of detensioning unit. This is in contrast to other forms of VIM, such as liquid filled VIMs, which have very little capability in regards to mechanical winching.

In addition to the features already mentioned it is necessary to be able to transmit data to the towing vessel from the sensors through the towing section in all cases and where a tall buoy is attached, it may be necessary to communicate data to and from the tall buoy.

Active sections of the towed streamer are generally designed to be towed horizontally, this being achieved by ensuring that the density is close to being equal to that of the water. It is also preferably that the towing sections close to, both fore and aft of the sensor section are also close to neutral buoyancy to reduce the effects of cross flow and thus limit vibrational noise generation.

A further requirement for the tow section may be to depress the active section to the required working depth. This can be achieved by attaching a heavy body to the tail end of the tow section, or body with planes attached which can be angled to provide a downwards force or if necessary an upwards force in special circumstances. Alternatively the depression can be achieved by using a heavy tow section which has a density greater than water.

In some applications it is necessary that the streamer is operated in two modes, an operational mode where the streamer is towed at a relatively slow speed to allow data to be gathered by the active sections, and a sprint mode where the streamer is towed at a high speed to enable the tow ship to transit rapidly between operational areas.

The main problem with the high speed mode is that excessive elongation of the towing sections can occur thus imposing strain on the data carriers.

Generally therefore such towed streamers are provided with high tensile, non-compliant strength members extending longitudinally to transmit tension along the streamer. However a problem with the use of such non-compliant strain members is that whilst their rigidity is satisfactory for taking towing strain, the rigidity amplifies undesirable noise especially during the, operational mode.

SUMMARY OF THE INVENTION

One object of this invention is to provide a towed streamer that will obviate or minimize any one or more of the disadvantages of streamers of the prior art in a simple yet effective manner or at least provide the public with a useful choice.

It is a further object of this invention to reduce the vibrational energy at the sensors by damping the energy in the tail or the towing sections, whilst still retaining the ability to withstand a load. This damping can achieved by the use of highly damped load bearing members in the tail of towing sections which also have a low elastic modulus, which makes such sections elastic when compared with the active section. The difficulty with this however is that if a load is applied as for example in the sprint mode, the towed streamer elongates far more than the data bearers are designed to withstand and this difficulty is more evident with towing modules rather than with the trailing modules.

The above objects can be met in solid towed streamers having a buoyant core by providing the streamer with a strength means adapted to transmit tension along the streamer which strength member is compliant to a predetermined level.

This enables for sufficient strength to be imparted for given sections of the towed streamer over the range of compliance required. Thus where a lesser strain is exhibited such as at the the trailing module of the streamer, the compliance can be far greater than for example the leading module of the streamer. In the former case the strain may be adequately transferred through compliant strain members, and thus for example, nylon strain members might be used. In the latter case however it might be desired to use a combination of compliant members and non-compliant members. For example the compliant and the non-compliant strain members might be arranged longitudinally along the streamer, the non-compliant members being for example accommodated within a groove and able to move relative to the groove, so that in a resting position the non-compliant members might have some slack, which slack determines the extent to which the compliant members can stretch before the more rigid non-compliant strain members take up the strain.

Braiding of the strain members whether of compliant or non compliant material can also meet the object of this invention. In this form the strain members can be braided around the centrally located core. The strength members are braided to surround the core, and can themselves be enveloped by a layer of resilient material. Once a predetermined amount of elongation of the streamer occurs individual strength members becomes less compliant.

The extent of the non-compliance of such a braided arrangement can depend to some extent on the nature of the core. Thus where an easily deformable core is made the angle to which the braid strain members move will be somewhat greater than where a less deformable core exists so that individual strain members making up the braid will act frictionally upon adjacent members to cooperatively cause the braid to become non-compliant. The extent to which the streamers can be stretched before the non-compliant state is reached is dependent inter alia on the angle of the braid relative to the longitudinal axis of the streamer.

Thus if very compliant members are desired strain members of a compliant material, for example nylon, can be used and braided, so that once the braiding contacts the buoyant core the strain means is still relatively compliant, if compared to more rigid strain members such as might be formed from material such as that sold under the trade mark "KEVLAR" or sold under the trade mark "VECTRAN."

Preferably in the above embodiments the strength members are embedded within a solid layer of the streamer. It is however also possible to have such strain members within a gel filled layer. Such a gel filled layer can for example be positioned surrounding a central buoyant core and encased by an elastomeric inner jacket, which inner jacket is surrounded by an outer jacket. The non-compliant strength members are positioned within gel filled layer and around the buoyant core. In this way the non-compliant strength members can be positioned so as to have some slack when the streamer is in its resting position. Compliant strength members can be arranged to lie parallel with the non-compliant strength members to take the lower range of strain.

The invention also includes a construction where axially non-compliant and compliant members are incorporated into the streamer section by the use of controlled tensions during the laying operations.

The invention also includes streamer sections whereby the load is required to be carried by different members as the speed of the streamer is varied.

It can be understood that by applying excessive strain to compliant members prior to application of the non-compliant, high tensile members, the non-compliant members can be arranged to be off loaded during low towing loads.

The above feature makes these sections useful in preventing tow induced vibration reaching sections with motion sensitive sensors fitted.

In one form the invention could be said to reside in a towed streamer including an inner portion, said inner portion including a central core 1, and strength members 3 positioned to transit tension along the streamer, arranged to render the streamer compliant for a predetermined elongation of the streamer, said streamer including an outer jacket encasing the inner portion.

BRIEF DESCRIPTION OF THE DRAWINGS

The actual construction of the streamer can be substantially varied but for a better understanding the invention will now be described with reference to preferred embodiments which will be described with reference to drawings in which.

DESCRIPTION OF THE PREFERRED EMBODIMENTS

Figure 1:
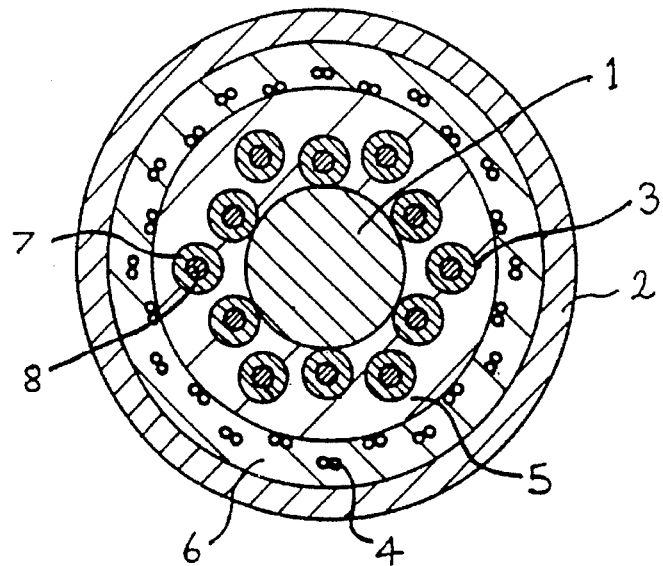
FIG. 1 is schematic cross-section of a first embodiment of this invention.

Similar reference characters indicate corresponding parts throughout the several views of the drawings.

Dimensions of certain of the pans as shown in the drawings may have been modified and/or exaggerated for the purposes of clarity of illustration.

The embodiments of the towed array streamer generally include a centrally located buoyant core I around which the rest of the streamer is built. The streamer is generally encapsulated by an outer jacket 2. Strength members 3 are arranged within the streamer to transmit tension along the length of the streamer. A data bearer layer is formed by data bearer wires 4 in some embodiments of the invention, but is not be present in all embodiments. The buoyant core 1 is a lightweight component, and generally provides buoyancy. However for a heavy tow section, the core can be made of a material with higher density. The material used to make this component can vary and might be a single polymer or a composite material can therefor vary in its modulus. Typical materials used are neoprene and thermoplastic rubber.

The strength members 3 can vary in their composition, and generally two types of strength members used in the illustrated embodiments. Non-compliant members are of a high tensile nature and can be made up of individual strands of a high tensile material such as materials known and sold under the Trade Marks "KEVLAR", and "VECTRAN". Such strength members have a few, for example three, strands twisted together, and then have several, for example sixteen, such twisted strands braided together to form a single strength member. Such non-compliant strength members might allow for a longitudinal elongation of, for example 4% of the length of the streamer, under conditions of high speed.

Compliant members can have a similar structure, but are made from a more compliant material such as nylon and can allow for much greater elongation for example greater than 10%, and obviously elongation of the strength member occurs as a result of less tension than is required to elongate non-compliant member. The strength members being braided have interstices between individual strands, and these are impregnated with a gel. This gel filling prevents compression of the strength member.

The outer jacket 2 provides an abrasion resistant outer barrier which is also water impervious and prevents water from penetrating the cable. A suitable material for making the outer jacket is a thermoplastic polyurethane.

Figure 2:
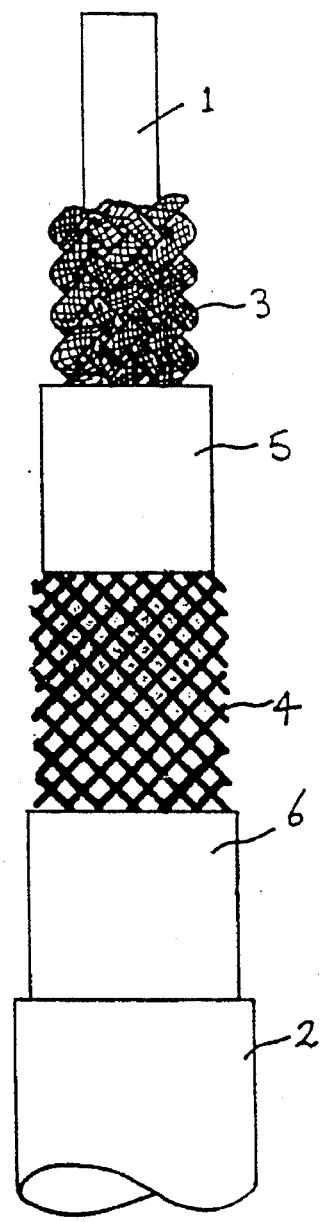
FIG. 2 is a plan view of the first embodiment with the layers successively stripped off.

Referring specifically to the first embodiment, shown in FIGS. 1 and 2, strength members 3 are embedded within a first inner jacket 5, and a second inner jacket 6 surrounds first inner jacket. Data bearers 4 are embedded within the second inner jacket.

The strength members can take two forms, and in the first form high tensile strands are twisted and braided together to form a strength member as described above, however by using a larger number of twisted members, the high tensile strands form a generally cylindrical shape 7, the hollow of which is filled with cotton twine 8. Filling with a solid material like cotton twine prevents the flattening of such a strength member on tension being applied, and thereby better maintains the relative position of the component layers of the streamer.

The strain members used in this first form are of a high tensile nature and if laid longitudinally provide a non-compliant transmission of tension along the streamer. The strain members in this embodiment however are braided, the braiding being such that on the application of strain the braid angle, relative to the longitudinal axis of the streamer, is decreased. The braided strength member therefore during initial elongation exhibits limited transmission of tension, and with increasing elongations, the strength members of the braid frictionally engage each other to an increasing extent and may compress against the core to an increasing extent. Thus the strength members are arranged to give variable compliance in response to the extent of elongation of the streamer. The characteristics of the extent of the variable compliance can be altered depending upon the braid angle and the number of strands in the braid.

The nature of the strands forming the strength member can also affect the tension transmission along the streamer. Thus in a second form of the first embodiment the more compliant nylon strands are used, and the overall compliance of the streamer is significantly increased.

The data bearers in this embodiment are also braided, and the angle and tightness of braiding is complementary to the braiding and compliance of the strength member braid in a way that provides that the data member braid is not put under strain on elongation of the streamer.

The method of making the first embodiment includes the forming of a core 1 of low density around which are overbraided strength members 3 filled with cotton twine. This is then gel-filled and has extruded over and around it a first inner jacket 5 of thermoplastic rubber. The data bearers 4 are braided around the first inner jacket and the second inner jacket 6 made of thermoplastics rubber is extruded over that assembly. The outer thermoplastics polyurethane jacket 2 is extruded over that assembly.

Figure 3:
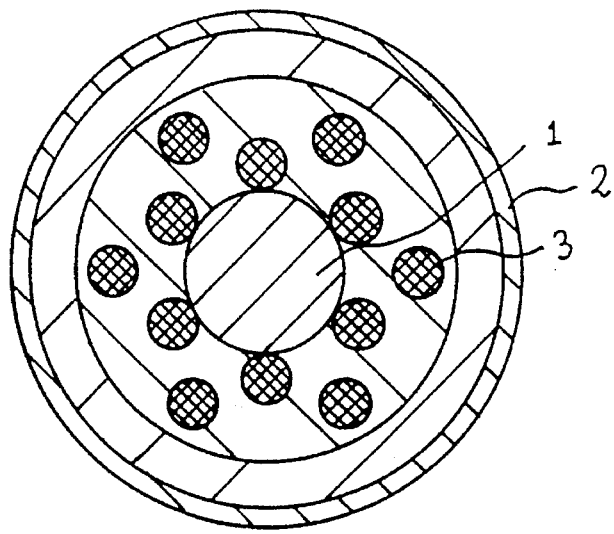
FIG. 3 shows is a schematic cross-section of a second embodiment of the invention.
Figure 4:
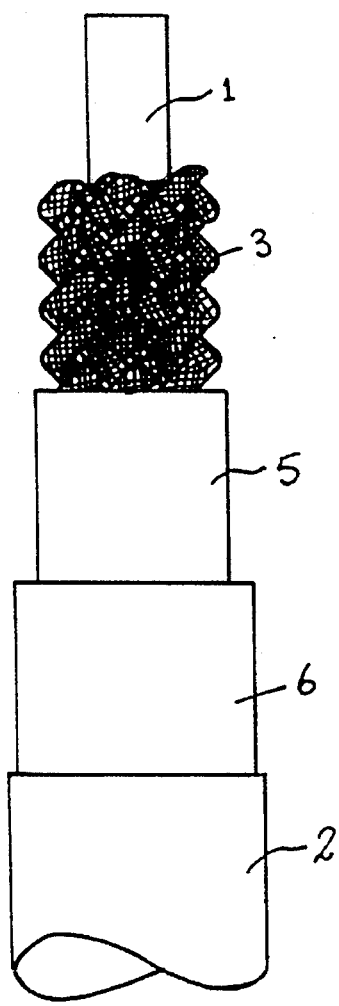
FIG. 4 is a plan view of the second embodiment with the layers successively stripped off.

Referring now to the second illustrated embodiment as shown in FIGS. 3 and 4, strength members 3 are embedded within a first inner jacket 5, and a second inner jacket 6 surrounds first inner jacket. There are no data bearers in this embodiment, and such an embodiment can be used for example in the tail portion of the towed streamer.

The structure is thus quite similar to that of the first embodiment except that the braided strength members are not cotton fibre filled and are specifically based on nylon, as a material. The strength members like the strength members of the first embodiment are gel filled. This structure has similar compliance characteristics to the compliance characteristics of the second form of the first embodiment of the invention.

In this embodiment the streamer is made by extruding a thermoplastic rubber core 1 and overbraiding the core with Nylon braid cord 3. This is then gel-filled and then jacketed with the first inner jacket 5 by extrusion of the jacket and then the second inner jacket 6 with the outer Thermoplastics polyurethane jacket 2 being extruded over the second inner jacket.

Figure 5:
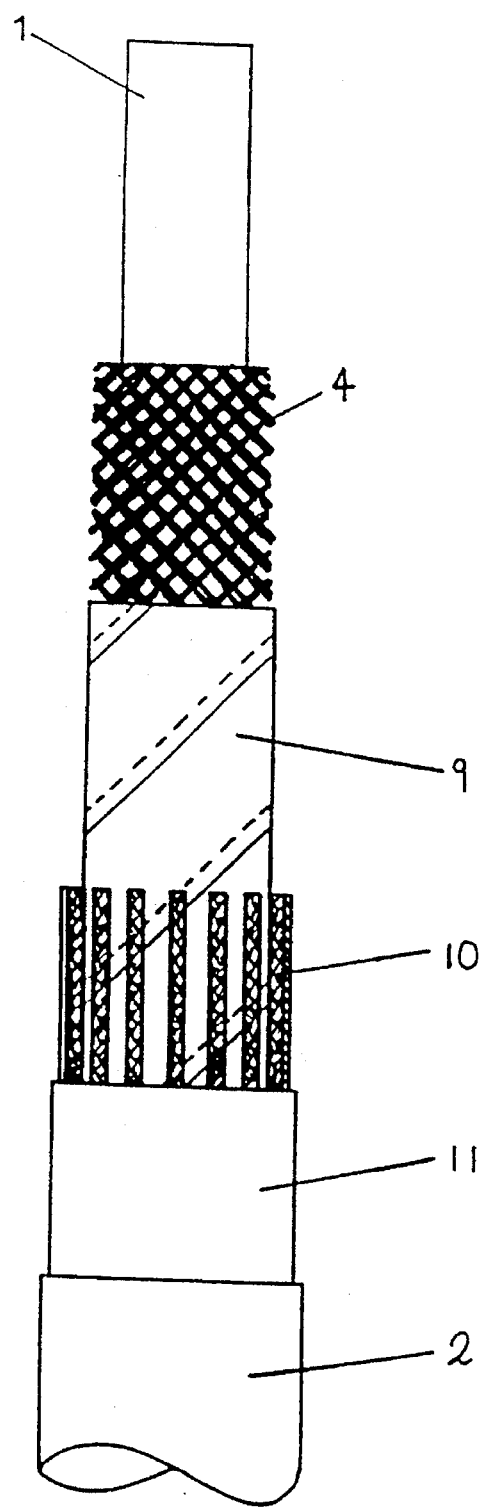
FIG. 5 is a schematic plan view of the general layout of the third fourth and fifth embodiments of the invention.

The embodiments shown in FIGS. 5 and 6 have the cross sectional structure as one another except that the core structure varies. Generally, therefore a core 1 is surrounded by a braided data bearer 4 layer. The braided data bearer layer is gel filled to form a gel-filled layer. The gel filled layer is paper wrapped; having a strip of paper 9 wound helically over the gel filled layer. Compliant strain members 10 are positioned longitudinally along the streamer, and are positioned to transmit tension along the streamer, and a thermoplastics rubber inner jacket 11 is extruded over and around the compliant strength members. The whole streamer is encased by a thermoplastic polyurethane outer jacket 2, which jacket is extruded over the inner jacket.

Figure 6A:
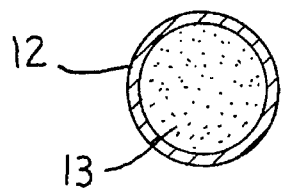
FIGS. 6a–6d show a schematic cross section of the third embodiment in FIG. 6(a), the fourth embodiment in FIG. 6(b), and the fifth embodiment in FIG. 6(c) and FIG. 6(d).
Figure 6B:
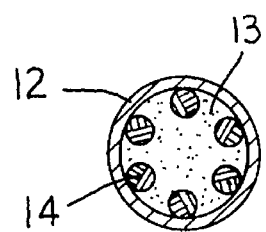

In the third embodiment shown in FIG. 6a, the core comprises a core tube 12 with a central hollow 13 which is gel filled. This core thus provides no non-compliant strength members, with tension being transmitted only by reason of the compliant strength members 10 within the inner jacket 11.

In the fourth embodiment shown in FIG. 6b the core is again gel filled but having arranged therein a plurality of non-compliant strength members 14, laid longitudinally. In this embodiment then the non-compliant strength members are positioned so as to have some slack, So that on a predetermined elongation of the streamer, these non-compliant strength members become engaged. The gel filled core isolates the tension transferred along the strength members from the layers outside of the core 1.

Thus in the operational mode where the streamer is towed at relatively slow speed the non-compliant strength members are not engaged, and therefore vibrations associated with strength members are damped by reason of the compliance of the compliant strength member 10.

Figure 6C:
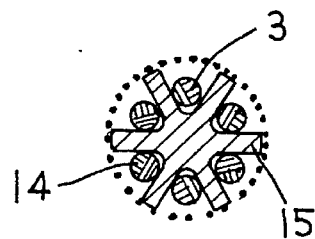
Figure 6D:
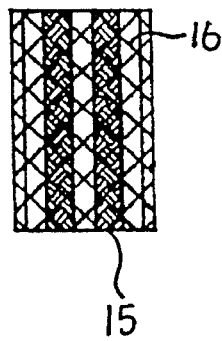

In the fifth embodiment shown in FIG. 6c the core 1 includes a fluted central member 15 with non-compliant-strength members 14 laid within grooves of the fluted member. Braided over the fluted member is a polyfill cord 16, and this is simply to maintain the strength members 14 within the grooves.

Various features of the invention have been particularly shown and described in connection with the illustrated embodiments of the invention; however, it must be understood that these particular arrangements merely illustrate and that the invention is to be given its fullest interpretation within the terms of the appended claims.

I claim:

1. A towed streamer comprising:

a central core, said central core including a longitudinal core tube;

a plurality of longitudinally extending non-compliant strength members aligned in spaced-apart relationship within the core tube of said central core;

a gel disposed within the core tube of said central core and surrounding said non-compliant strength members;

a data bearer layer disposed annularly about said central core, said data bearer layer including data bearer wires, a gel filling, and a wrapping;

a plurality of compliant strength members positioned on said data bearer layer;

an inner jacket formed over and around said plurality of compliant strength members; and an outer jacket encasing said inner jacket, whereby said compliant strength members render the streamer compliant for a predetermined elongation, after which the non-compliant strength members act to render the streamer non-compliant.

2. The towed streamer defined in claim 1, wherein said data bearer layer includes braided data bearer wires.

3. The towed streamer defined in claim 1, wherein said plurality of compliant strength members are longitudinally aligned within said inner jacket.

4. The towed streamer defined in claim 1, wherein the wrapper in said data bearer layer is formed by a helically wound paper strip.

5. A towed streamer comprising:

a central core, said central core including a longitudinal core tube;

a fluted central member extending longitudinally in the core tube and forming a plurality of longitudinal grooves;

a plurality of longitudinally extending non-compliant strength members aligned within the longitudinal grooves of said fluted central member;

a gel disposed within the core tube of said central core and surrounding said fluted central member and said non-compliant strength members;

a data bearer layer disposed annularly about said central core, said data bearer layer including data bearer wires, a gel filling, and a wrapping;

a plurality of compliant strength members positioned on said data bearer layer;

an inner jacket formed over and around said plurality of compliant strength members; and an outer jacket encasing said inner jacket, whereby said compliant strength members render the streamer compliant for a predetermined elongation, after which the non-compliant strength members act to render the streamer non-compliant.

6. The towed streamer defined in claim 5, including a cord braided over said fluted member to maintain said non-compliant strength members within the grooves of said fluted member.

7. The towed streamer defined in claim 5, wherein said data bearer layer includes braided data bearer wires.

8. The towed streamer defined in claim 5, wherein said plurality of compliant strength members are longitudinally aligned within said inner jacket.

9. The towed streamer defined in claim 5, wherein the wrapper in said data bearer layer is formed by a helically wound paper strip.

10. A towed streamer comprising:

a central core;

a plurality of compliant strength members braided with respect to one another and positioned annularly about said central core;

a gel disposed about said plurality of compliant strength members on said central core;

an inner jacket formed over and around said plurality of compliant strength members; and an outer jacket encasing said inner jacket, whereby said braided compliant strength members render the streamer compliant for a predetermined elongation, after which said braided compliant strength members frictionally engage on another and said central core to render the streamer non-compliant.

11. A towed streamer defined in claim 10, including a data bearer layer formed between said inner jacket and said outer jacket.

12. A towed streamer defined in claim 11, wherein said data bearer layer includes a plurality of braided data bearers positioned about said inner jacket and a second inner jacket formed over and around said plurality of braided data bearers.

13. A towed streamer defined in claim 10, wherein said compliant strength members are formed from nylon.

14. A towed streamer defined in claim 10, wherein said central core includes a core tube and a gel disposed within the core tube.

* * * * *